United States Patent [19]

Yasuda

[11] 4,032,440
[45] June 28, 1977

[54] SEMIPERMEABLE MEMBRANE

[75] Inventor: Hirotsugu Yasuda, Durham, N.C.

[73] Assignee: The United States of America as represented by the Secretary of the Interior, Washington, D.C.

[22] Filed: Nov. 18, 1975

[21] Appl. No.: 633,140

[52] U.S. Cl. .................. 210/23 H; 210/500 M; 427/245
[51] Int. Cl.² ................ B01D 31/00; B01D 13/00
[58] Field of Search .......... 210/500 M, 23 H, 23 F, 210/22, 321 R; 427/245

[56] References Cited
UNITED STATES PATENTS 3,775,308  11/1973  Yasuda ................. 210/500 M X
3,847,652  11/1974  Fletcher et al. ........ 210/500 M X Primary Examiner—Frank A. Spear, Jr.
Assistant Examiner—David R. Sadowski
Attorney, Agent, or Firm—William S. Brown; Donald A. Gardiner

[57] ABSTRACT

A semipermeable composite membrane is prepared by glow discharge polymerization of a combination of an organic monomer and an inorganic monomer in the presence of a porous support, the polymerization resulting in deposition of a thin film of copolymer on the surface of the support.

14 Claims, No Drawings

SEMIPERMEABLE MEMBRANE

Formation of semipermeable composite membranes by electrodeless glow discharge polymerization of organic monomers in the presence of a porous support is disclosed in applicant's U.S. Pat. No. 3,775,308. The monomers employed therein were preferably nitrogen-containing hydrophilic compounds, the polymers of which were sufficiently hydrophilic to provide good reverse osmosis properties. However, the polymerization process of the patent tends to result in polymers of reduced hydrophilicity and, consequently, the process is somewhat limited to the suitable monomers.

It has now been found, according to the invention, that the process of U.S. Pat. No. 3,775,308 may be extended to provide for preparation of efficient reverse osmosis membranes from a variety of monomers that would not otherwise provide sufficient hydrophilicity for reverse osmosis applications. The process of the invention consists of vapor phase copolymerization of organic monomers with inorganic monomers capable of imparting hydrophilic properties to the resulting polymers. This copolymerization can be achieved by the electrodeless glow discharge polymerization process disclosed in U.S. Pat. No. 3,775,308, or by a capacitively coupled electric discharge utilizing a.c. power in the range of about 60 Hz to radio frequency.

The organic monomers found to be most useful in the invention are unsaturated aliphatic or aromatic hydrocarbons, or heteroaromatic compounds, preferably containing about 1 to 10 carbon atoms. Examples of suitable unsaturated aliphatic hydrocarbons are acetylene, ethylene, allene, butadiene, isobutylene, acrylonitrile and acetonitrile. Examples of suitable aromatic hydrocarbons are benzene, toluene, xylene, styrene, $\alpha$-methyl styrene and ethyl benzene. Examples of suitable heteroaromatic compounds are 4-picoline, 3,5-lutidine, 4-vinylpyridine, pyridine, furan, furonitrile and furfurylamine.

The inorganic monomers found to be most useful in the invention are carbon monoxide, water vapor and nitrogen. Other suitable inorganic monomers include hydrogen sulfide, sulfur dioxide, ammonia and oxygen. These may be employed singly or in combination. E.g., combinations of water vapor and nitrogen, or water vapor and carbon monoxide, have been found to copolymerize with organic monomers to yield efficient and readily formed reverse osmosis membranes.

Optimum vapor phase proportions of the monomers for copolymerization will vary widely depending on the specific monomers employed, polymerization reaction conditions, i.e., temperature pressure, time, nature of the support, frequency and power of the applied electromagnetic energy,, etc., and are best determined experimentally. However, generally a mole ratio of organic monomer to inorganic monomer of about 10:1 to 1:5, preferably about 5:1 to 1:2, is satisfactory. Where a combination of inorganic monomers is employed, optimum mole ratios of the inorganic monomers will generally be that which provides the product copolymer with sufficient hydrophylic groups for efficient reverse osmosis activity. In the case of a combination of either carbon monoxide or nitrogen with water vapor, suitable mole ratios have generally been found to range from about 1:1 to about 5:1, i.e., 5 moles of CO or $N_2$ per mole of $H_2O$.

The polymerization process employed may be that of U.S. Pat. No. 3,775,308, in which the monomer mixture, in vapor form, is subjected to the influence of electromagnetic energy in the presence of a porous support. The electromagnetic energy is of a frequency and power sufficient to cause an electrodeless glow discharge in the vapor, resulting in copolymerization of the organic and inorganic monomers and deposition of the polymer on the support.

The support materials are the same as those employed in U.S. Pat. No. 3,775,308, although the optimum type of support material may vary with different types and combinations of organic and inorganic monomers employed in preparation of the membranes, as well as the specific utility of the resulting composite membrane. Generally, polysulfone and cellulose acetate-cellulose nitrate support materials have been found to be particularly effective for preparation of the membranes of the invention.

Polymerization reaction conditions and apparatus for electrodeless glow discharge polymerization are the same as those employed in U.S. Pat. No. 3,775,308, with a pressure of about 0.01 to 1 mmHg and ambient temperature being suitable. Capacitively coupled electric discharge using electromagnetic energy of a frequency of about 50 Hz to 1000 mHz and power of about 10 to 1000 watts can also be used to achieve essentially the same results. Reaction times of about 1 to 60 minutes are generally satisfactory; however, shorter times, such as about 2 minutes or less, are frequently sufficient to provide the product membranes with the desired reverse osmosis properties. Although the polymerization process of the invention may employ various methods of polymer deposition, as described in U.S. Pat. No. 3,775,308, a continuous process flow system is frequently possible because of suitably short reaction times.

Although the exact mechanism of the polymerization reaction, and the specific structure of the polymer products of the invention, are not known with certainty, it is believed that the process of the invention results in incorporation of hydrophilic groups into the polymer structure, thus enhancing reverse osmosis properties. For example, copolymerization of carbon monoxide and water vapor with hydrocarbon monomers has been found to result in formation of polymers characterized by the presence of carbonyl groups, while copolymerization of nitrogen and water vapor with hydrocarbon monomers generally produces polymers containing amide groups. Thus, by the process of the invention, the number and variety of organic monomers that may be used in preparation of reverse osmosis membranes is greatly increased. In addition, the copolymers of the invention have generally been found to exhibit superior reproducibility, as well as stability in the presence of chlorine.

The desalination devices in which the composite membranes of the invention are typically employed are conventional and are discussed in U.S. Pat. No. 3,775,308, as are other potential uses of the membranes, such as gas separation, water pollution control and biomedical applications The following examples will serve to more particularly illustrate the invention.

EXAMPLE 1

In this example, plasma copolymerization of acetylene, water vapor and nitrogen was carried out by means of radio frequency energy of 13.5 mHz. The apparatus used was that described in U.S. Pat. No.

3,775,308, and consisted of a glass tube polymerization vessel with means for applying a radio-frequency voltage via inductive coupling. A porous support consisting of polysulfone film having a pore size of about 300 Å and thickness of about 30 μm was placed in the polymerization vessel and the vessel was evacuated to a vacuum of less than 1 μmHg. The vapor phase monomer mixture, consisting of an acetylene:water:nitrogen mole ratio of 30:7.5:20, was introduced into the vessel to a steady state flow pressure of 60 μmHg and polymerized at a discharge wattage of 30 watts for about 2 minutes.

The resulting composite membrane, consisting of the porous support coated with a thin layer (about 600 Å in thickness) of the copolymer, was then tested in a reverse osmosis apparatus with 3.5% NaCl solution at 1500 psi pressure using a high flow system. Salt rejection was 95%, with a water flux of 14.2 gfd.

EXAMPLE 2

The procedure of this example was the same as that of Example 1 except that the organic monomer was 4-picoline, the vapor phase mole ratio of 4-picoline:water:nitrogen was 20:5:40 and the deposition time was 7 minutes. The resulting composite membrane gave a salt rejection of 97.2% and a flux of 16.0 gfd.

EXAMPLE 3

The procedure of this example was essentially the same as that of Example 1 except that carbon monoxide was substituted for the nitrogen monomer, and the porous support consisted of a film of cellulose nitrate-cellulose acetate having a pore size of about 200 Å and a thickness of about 50 μm. The vapor phase mole ratio of acetylene:water:carbon monoxide was 37.9:12.9:18.1. The resulting composite membrane, consisting of the porous cellulose nitrate-cellulose acetate support coated with a 500 Å thick layer of the copolymer, gave a salt rejection of 95.4% with a flux of 31.2 gfd.

EXAMPLE 4

The procedure of this example was the same as that of Example 1 except that the organic monomer was benzene, rather than acetylene. Reverse osmosis results showed a salt rejection of 96% and a flux of 20 gfd.

EXAMPLE 5

The procedure of this example was essentially the same as that of Example 1 except that the organic monomer was pyridine and the inorganic monomer was water. The vapor phase mole ratio of pyridine:water was 5:1. The porous membrane of cellulose nitrate — ellulose acetate described in Example 3 was presaturated at the vapor pressure of 60 μmHg (mixed monomers), and polymerized for 2 minutes by 30 watts discharge. The resulting composite membrane with an approximately 500 Å thick layer of the copolymer gave a salt rejection of 99.2% with a flux of 21 gfd.

EXAMPLE 6

In this example, plasma copolymerization of furfurylamine and water was carried out by means of capacitively coupled discharge of 10 KHz electromagnetic energy. Aluminum electrodes of 10 cm diameter were placed 5 cm apart in a glass tube. The flow of monomers was maintained in a direction parallel to the electrode surfaces. A porous substrate of cellulose nitrate-cellulose acetate was placed directly on the surface of an electrode. The vapor phase monomer mole ratio of furfuryl amine:water was 9:1, and a steady state flow pressure of 100 μmHg was established before the plasma polymerization. The polymerization was carried out by maintaining the current of 5 mA for 2 minutes. The resulting composite membrane gave a salt rejection of 98.0% with a water flux of 30 gfd.

I claim:

1. A process for preparation of a composite semipermeable membrane comprising: (1) positioning a porous support in an atmosphere comprising a polymerizable admixture of (a) an organic monomer from the group consisting of acetylene, ethylene, allene, benzene, pyridine and furfurylamine and (b) an inorganic monomer consisting of water or a mixture of water with nitrogen or carbon monoxide, said admixture being in vapor form, and (2) subjecting said admixture to the influence of electromagnetic energy of a frequency of about 50 Hz to 3000 mHz to produce an electric glow discharge, thereby causing copolymerization of the monomers and deposition of the resulting copolymer as a film on the surface of the support.

2. The processor claim 1 in which the porous support consists of an organic polymeric material.

3. The processor claim 2 in which the organic polymeric material is a mixed polymer of cellulose acetate and cellulose nitrate.

4. The process of claim 2 in which the organic polymeric material is polysulfone.

5. The process of claim 1 in which the organic monomer is acetylene.

6. The process of claim 1 in which the organic monomer is ethylene.

7. The process of claim 1 in which the organic monomer is allene.

8. The process of claim 1 in which the organic monomer is benzene.

9. The process of claim 1 in which the organic monomer is pyridine.

10. The process of claim 1 in which the organic monomer is furfurylamine.

11. The process of claim 1 in which the inorganic monomer is water.

12. The process of claim 1 in which the electromagnetic energy has a frequency in the range of about 50 Hz to 1000 mHz.

13. A composite semipermeable membrane prepared by the process of claim 1.

14. In a process for desalination of saline water by reverse osmosis comprising contacting the saline water under pessure with a reverse osmosis membrane, the improvement comprising using the composite membrane of claim 13 as the reverse osmosis membrane.

* * * * *